United States Patent [19]

Mir

[11] 4,375,647
[45] Mar. 1, 1983

[54] LIGHT VALVE SCANNER AND SCANNER/PRINTER APPARATUS FOR COLOR ORIGINALS

[75] Inventor: José M. Mir, Rochester, N.Y.

[73] Assignee: Eastman Kodak Company, Rochester, N.Y.

[21] Appl. No.: 268,935

[22] Filed: Jun. 1, 1981

[51] Int. Cl.³ .............................................. H04N 1/22
[52] U.S. Cl. ......................................... 358/75; 355/4
[58] Field of Search ................... 358/75, 78, 285, 41, 358/43, 50, 44, 53, 54, 55; 355/4, 32

[56] References Cited

U.S. PATENT DOCUMENTS

| 4,125,322 | 11/1978 | Kaukeinen | 355/4 |
| 4,168,118 | 9/1979 | Mir | 355/4 |
| 4,229,095 | 10/1980 | Mir | 358/75 |

Primary Examiner—Michael A. Masinick
Attorney, Agent, or Firm—John D. Husser

[57] ABSTRACT

Apparatus for scanning succesive lines of a color original moved past a scan station includes: (1) photodetector means, (2) illuminating means for producing a plurality of discrete color separation illuminations of said detector means, via each passing original line, (3) a light valve array having discretely activatible pixel portions aligned with pixels of said scan station to control color separation illumination of the photodetector means and (4) scan address means for activating pixel portions of the array in a predetermined serial sequence and in timed relation with movement of the original.

22 Claims, 5 Drawing Figures

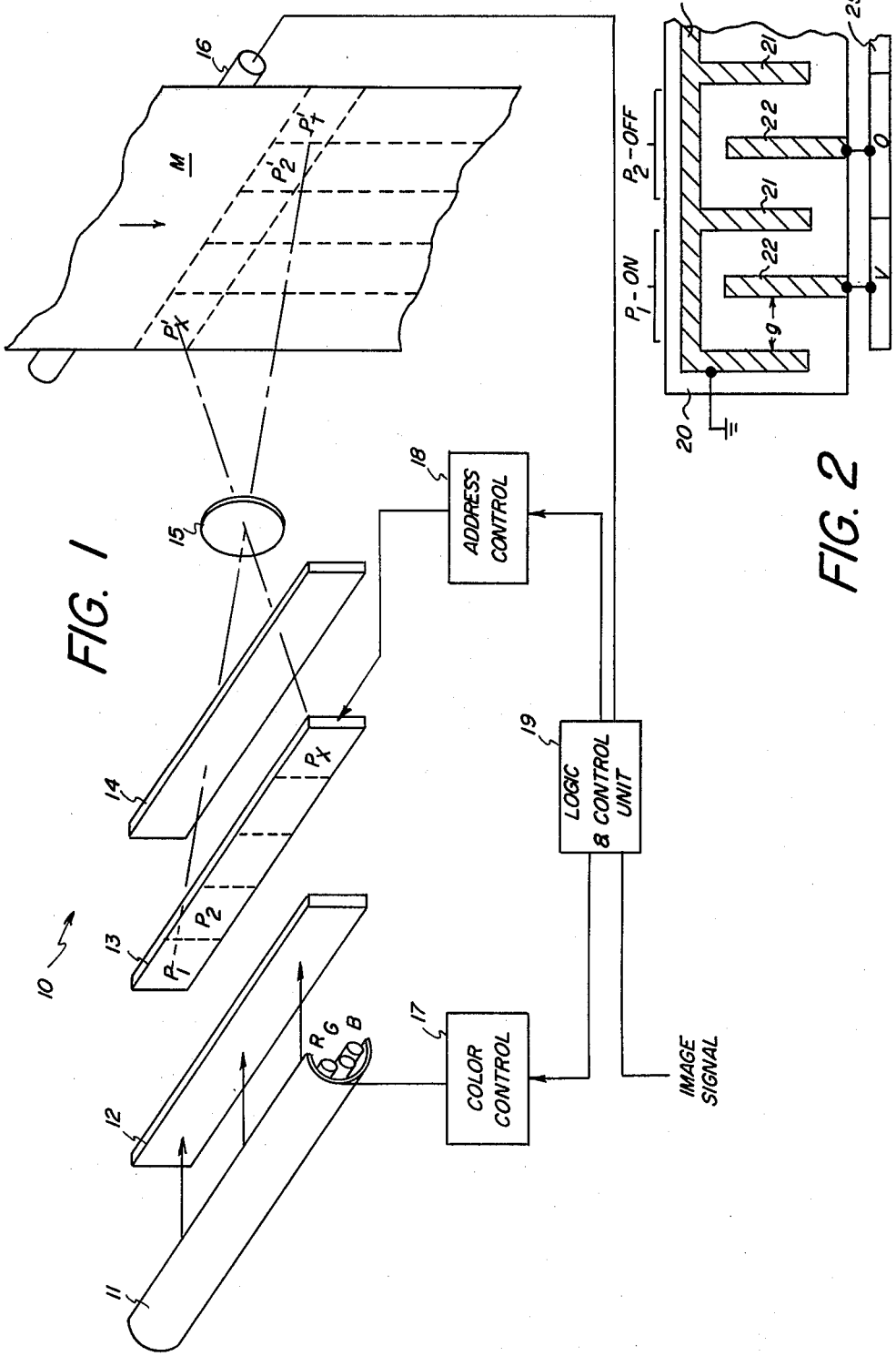

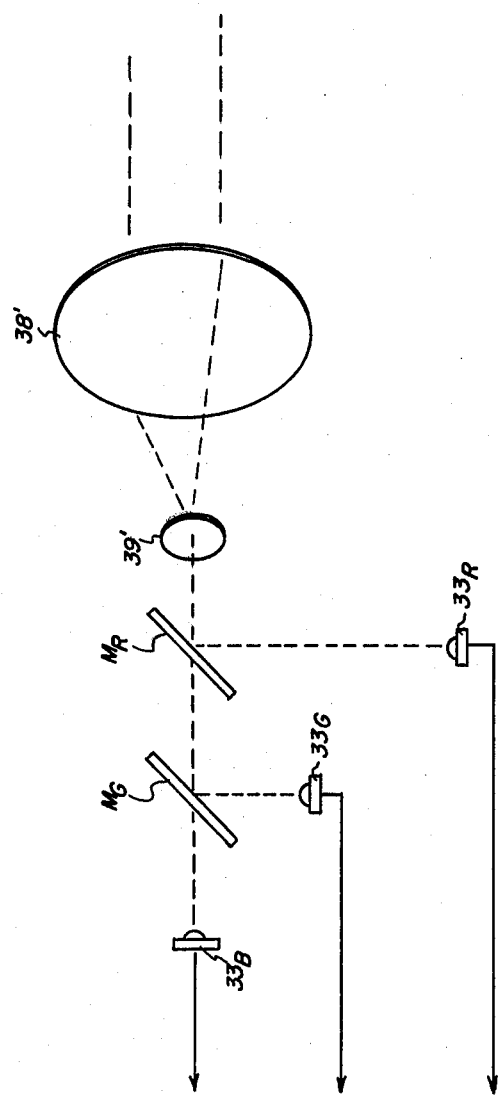

LIGHT VALVE SCANNER AND SCANNER/PRINTER APPARATUS FOR COLOR ORIGINALS

CROSS-REFERENCE TO RELATED APPLICATIONS

Reference is hereby made to U.S. patent application Ser. No. 230,096, entitled "Electronic Color Imaging Apparatus Having Improved Color Control Device", filed Jan. 29, 1981, in the name of J. M. Mir; U.S. patent application Ser. No. 230,089, entitled "Light Valve Imaging Apparatus Having Improved Optical Configuration," filed Jan. 29, 1981, in the name of J. R. Varner; U.S. patent application Ser. No. 230,095, entitled "Light Valve Imaging with Optimized Addressing Potential(s) to Reduce Inter-Pixel Nonuniformity," filed Jan. 29, 1981, in the name of J. M. Mir and U.S. patent application Ser. No. 230,099, entitled "Light Valve Imaging Apparatus Having Improved Addressing Electrode Structure", and filed Jan. 29, 1981, in the names of J. M. Mir and J. R. Varner.

BACKGROUND OF THE INVENTION

1. Field of the Invention

The present invention relates to apparatus for scanning a multicolor original and producing electrical signals indicative of the color image information of the original. More particularly the present invention relates to such scanning apparatus, and scanning/printing apparatus, using light valve arrays.

2. Description of the Prior Art

Recently, it has been found that light valve array devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatible to operate in a Kerr cell mode. An array of such light valves comprises such crossed polarizers and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute pixel portions of the panel. Upon application of such fields, the PLZT material becomes birefringent and rotates the direction of polarization of incident light by an extent dependent on the field magnitude. This results in transmission of light through the PLZT pixels and cooperating polarizers varying as a function of the respective addressing fields.

U.S. Pat. No. 4,229,095 discloses various embodiments of electronic color-imaging apparatus that utilize such light valve arrays to effect multicolor exposure of panchromatic recording media. For example, a color image is formed electronically by selectively opening and closing individual light valves of such arrays in synchronization with the energization of red, green and blue exposing sources and according to the red, green and blue color information for the pixels of that image. One preferred embodiment disclosed in that patent comprises a linear light valve array disposed in spaced transverse relation to the recording media feed path. The pixels of the array are addressed concurrently with image information, a line at a time, and the movement of the recording medium, and the red, green and blue color exposures are synchronized with successive actuations of the linear array.

In electronic color imaging devices of the kind described in U.S. Pat. No. 4,229,095 and in other kinds of electronic imaging apparatus (see e.g. U.S. Pat. Nos. 4,125,322 and 4,168,118), it is necessary to provide an information signal(s) containing color image information representative of the image to be reproduced. Usually, such information signal(s) are produced by scanning an original image.

One common mode for effecting such scanning is with a scanning light beam (e.g. a laser beam) sequentially deflected (e.g. with a polygon mirror or an acoustooptic cell) across successive lines of the original. An optical system is adapted to direct scan beam light (reflected from or transmitted by the original) to a photodetector which produces an electrical signal representative of the scanned original. In multicolor imaging, separate scans are effected (e.g., with red, green and blue light beams) to provide separate color signals.

Another common technique to effect such optoelectric scanning of an original is with a solid state light sensor array, e.g. a charge coupled device (CCD). Such solid state devices can sense in parallel, and store, the light-dark condition of all picture elements (pixels) of a line of the original. The pixel information is then clocked out serially to provide an electrical signal representative of that image line. Different color filters can be used in cooperation with such solid state sensor arrays to generate separate electrical signals for the different individual colors necessary to form a multicolor image.

SUMMARY OF THE INVENTION

One purpose of the present invention is to provide advantageous alternative structural and functional approaches for scanning color originals to provide electrical signals suitable for electronic imaging. One important advantage of the scanning approach of the present invention is its complimentary character vis-a-vis light valve color imaging apparatus. However, in other aspects, the present invention provides advantages whether used with light valve imaging apparatus or other electronic imaging apparatus, e.g. such as disclosed in U.S. Pat. Nos. 4,125,322 or 4,168,118. For example, the present invention avoids the mechanical complexity and exposure of polygonal mirrors and a laser commonly used to implement flying spot scanning. In comparison to CCD array color scan systems which utilize a plurality of complex electronic scan arrays, the present invention is implemented with only one electronic light valve scan array. Further for some applications the light valve scan array offers advantage as to larger active pixel zones and has the capability for operation at low clocking speeds.

In general the present invention, in one aspect, comprises apparatus for scanning successive lines of a multicolor original moved past a linear scan station and includes (1) photodetector means; (2) illuminating means for producing a plurality of discrete color separation illuminations of said photodetector means, via each original line passing the scan station; (3) a light valve array including a plurality of discrete pixel portions optically aligned, respectively, with discrete pixel zones of the linear scan station and individually addressable electrically to control color separation illuminations of said photodetector means; and (4) scan address means for addressing said array pixel portions, in a predetermined serial sequence and in timed relation with the movement of the original, to sequentially transmit illumination from respective pixel zones to said photodetector means. Thus, the photodetector means produces discrete color information signals, each including serial pixel information, for each line of the original passing the scan station.

In another aspect the present invention comprises scanner/printer apparatus having structure as described above for producing color information signals and further including memory means for storing and reproducing such signals and light valve printer apparatus for receiving said signals and exposing a light sensitive medium moving past a linear exposure station in accordance with such color signals. In another similar aspect such scanner apparatus cooperates with light valve printer apparatus having print address means coupled to photodetector of the scanning apparatus so that the recording medium can be exposed as the original is scanned.

Other preferred aspects of the present invention feature more specific advantageous structural embodiments of the general apparatus described above.

BRIEF DESCRIPTION OF THE DRAWINGS

The subsequent description of preferred embodiments of the invention refers to the attached drawings wherein:

FIG. 1 is a schematic perspective view of one embodiment of light valve printer apparatus with which the scanner apparatus of the present invention is particularly useful;

FIG. 2 is a plan view of a portion of one exemplary modulator panel such as can be used in light valve arrays of the FIG. 1 or FIG. 3 and 4 apparatus;

FIG. 5 is a perspective schematic view of another embodiment of the present invention illustrating an alternative preferred embodiment of illuminating and detector means.

DETAILED DESCRIPTION OF THE PREFERRED EMBODIMENTS

Figure 3:
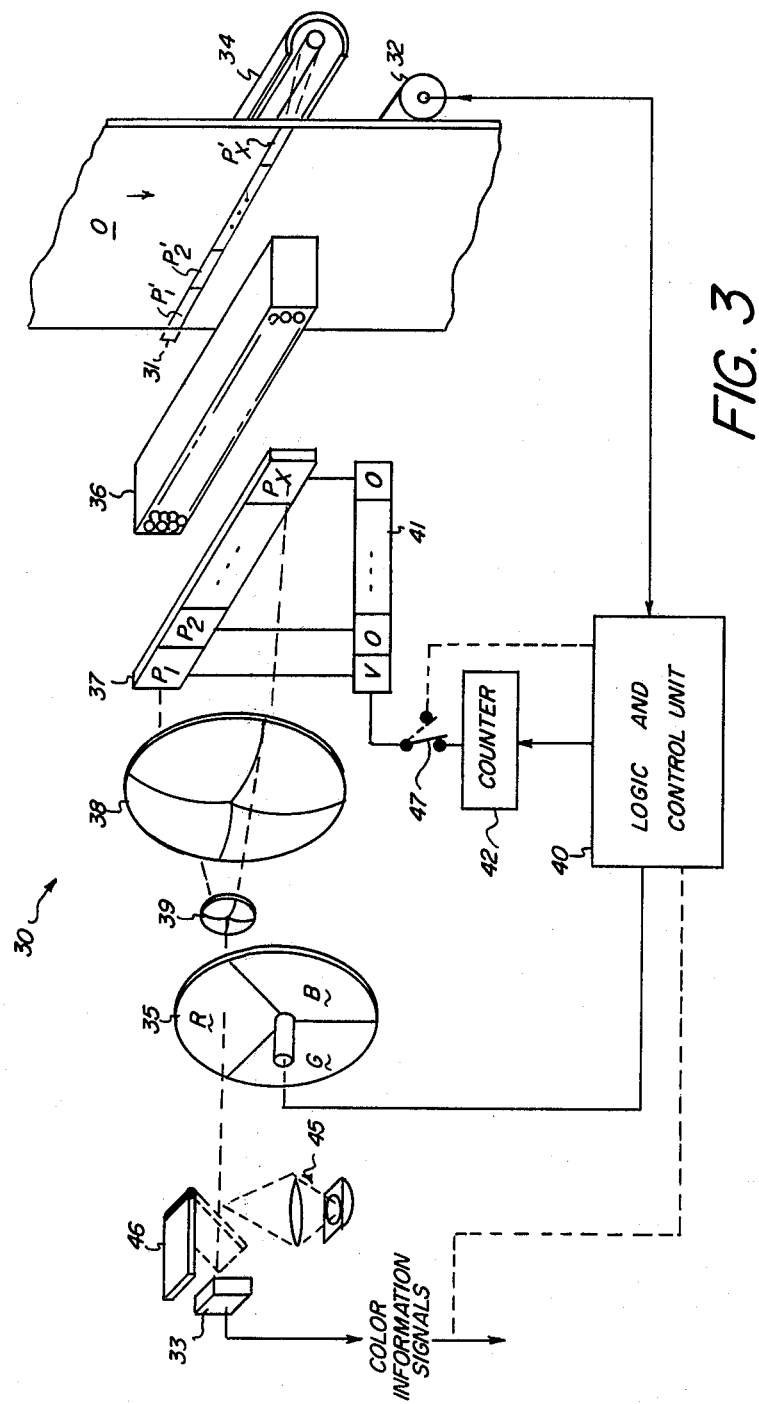
FIG. 3 is a schematic perspective view of one preferred embodiment of scanning or scanning/printing apparatus in accordance with the present invention.

Referring to FIG. 1, one embodiment of light valve color apparatus 10, with which the scanning apparatus of the present invention is useful, comprises an illumination source 11 for uniformly illuminating electro-optic modulator 13, through entrance polarizer 12, with different light colors in a sequential fashion. The illumination source can include, for example: (1) separately-energizable red (R), green (G) and blue (B) light sources as are illustrated in FIG. 1; (2) a panchromatic source and moving multicolor filter as disclosed in my aforementioned U.S. Pat. No. 4,229,095; or (3) an electro-optically controlled source of different color illumination such as disclosed in copending U.S. patent application Ser. No. 230,096, entitled "Electronic Color Imaging Apparatus Having Improved Color Control Device," filed Jan. 29, 1981, in the name of J. M. Mir. It is highly desirable that such illumination be provided substantially collimated and normal to the light ingress surface of the light valve and one preferred approach for implementing this is disclosed in U.S. patent application Ser. No. 230,089, entitled "Light Valve Imaging Apparatus Having Improved Optical Configuration," filed Jan. 29, 1981, in the name of J. R. Varner.

The electro-optic modulator 13 can be formed of a material such as disclosed in U.S. Pat. No. 4,229,095 (e.g. 9/65/35 PLZT), which transforms from an isotropic, non-polar state to a birefringent polar state in response to application of an electric field. As shown in more detail in FIG. 2, the modulator has reference electrodes 21 and signal electrodes 22 formed on the surface thereof in a configuration adapted to provide discrete, separately-activatable electric fields transversely across the pixel portions $P_1$–$P_5$ of the electro-optic panel 20. In the embodiment illustrated in FIG. 2, the reference electrodes 21 are commonly coupled to a source of reference potential, e.g., ground, and the signal electrodes of each pixel portion are separately addressable with a potential by addressing means, e.g. serial-in/parallel-out shift register 25 to activate their respective pixels to an ON or OFF condition. U.S. patent application Ser. No. 230,095, entitled "Light Valve Imaging with Optimized Addressing Potential(s) to Reduce Inter-Pixel Nonuniformity," filed Jan. 29, 1981, in the name of J. M. Mir discloses one preferred mode of selecting potential levels and is incorporated herein by reference. An exemplary addressing ("V" potential applied, "O" no potential applied) is shown in FIG. 2 for the pixel ON, OFF conditions indicated. There are a variety of electrode configurations which can be utilized to create discrete, separately-activatable fields transversely across the discrete pixel portions of a panel of electro-optic material, some of which are disclosed in copending U.S. patent application Ser. No. 230,099, entitled "Light Valve Imaging Apparatus Having Improved Addressing Electrode Structure," and filed Jan. 29, 1981, in the names of J. M. Mir and J. R. Varner.

In general, the application of an activating field across the inter-electrode gaps "g" of a pixel portion of the electro-optic material causes it to transform to a birefringent state and rotate the direction of polarization of light passing therethrough. Thus the polarized light from entrance polarizer 12 is rotated by activated pixels and is not rotated by non-activated pixels. Exit polarizer 14 is crossed relative to entrance polarizer 12 and therefore light passing activated pixel portions of the modulator 13 passes exit polarizer while light passing nonactivated modulator portions does not. Lens means illustrated schematically as 15 images the modulator array 13 at the apparatus exposure station wherepast a recording medium M is moved by transport means 16.

The movement of recording medium by transport 16, the energization of illumination source 11 by color control 17 and the activation of addressing means 25 by address control 18 are all synchronized, e.g. by logic and control unit 19 so that the $P_1$–$P_5$ pixel portions of each line of the recording medium are exposed or not to the different colors of light in accordance with the color image information of the image to be reproduced that is input to unit 19 e.g. in the form of an electrical signal containing such color image information.

Referring to FIG. 3, there is illustrated one apparatus 30 for scanning a color original O to be reproduced and providing electrical signals containing color information representative of that original. As indicated above, the general approach of the present invention includes photodetector means and means for producing discrete color separation illuminations of the photodetector means via each line of the color original O. Thus in the FIG. 3 embodiment, as the original O is moved past linear scan station 31 by drive means 32, photodetector 33 is so illuminated by panchromatic light source 34 and rotating multicolor filter disc 35. More particularly, while a line of the multicolor original O (in this instance a color transparency) is at scan station 31, panchromatic light from source 34 illuminates that line and lens array 36 (e.g. a gradient index fiber optic array) images the illuminated line onto scan light valve array 37. Focusing lens 38 and relay lens 39 are constructed and located to direct light passing light valve array 37 onto photodetector 33 via filter disc 35, which completes at least one revolution during each period of an original line at the scan station 31. Therefore, during each line period the photodetector is illuminated sequentially with red, blue and green color separation information of that line respectively during predetermined line sub-periods while the R, B and G filter sectors of disc 35 respectively are aligned along the illuminating light path.

As shown in FIG. 3, the scan light valve array 37 comprises a plurality of discrete pixel portions $P_1, P_2 \ldots P_x$, optically aligned, respectively, with pixel zones $P'_1, P'_2 \ldots P'_x$ of scan station 31. It should be noted that the number of light valve pixel portions will be much greater than is illustrated, e.g. as many as 250/inch for high resolution applications. The light valve array 37 can be constructed in the same forms as described above with respect to the print light valve array of print apparatus 10. The pixel portions $P_1, P_2 \ldots P_x$ are thus electrically addressable independently to control the passage of light from the original O to the photodetector 33.

In accordance with the present invention, the scan light valve pixel portions are addressed in a predetermined serial sequence to sequentially transmit light from respective pixel zones of the scan station to photodetector 33. More particularly, serial sequence control 41 (e.g. a shift register or multi-stage flip-flop) under the control of a resettable counter 42 is adapted to sequentially activate the scan array pixel portions by sequentially energizing the respective signal electrodes of the array. The initiation of each such serial sequence is controlled by logic and control unit 40, e.g. a microcomputer, in synchronization with the movement of the original (by drive 32) and the rotation of filter disc 35 (by drive means not shown). Thus during each of the red, green and blue sub-periods, the pixel portions $P_1, P_2 \ldots P_x$ are sequentially activated to effect sequential illumination of the photodetector 33 with image line information for zones $P'_1, P'_2 \ldots P'_x$.

Photodetector 33 is constructed to have panchromatic sensitivity so that the above described sequence, including at least three pixel-by-pixel color separation line scans by the scan array 37, will produce corresponding successive color information signals, each including serial pixel information, for each line of the original passing the scan station.

In accordance with one preferred embodiment of the present invention such color information signals are input to unit 19 of light valve color printer apparatus 10 shown in FIG. 1. In this embodiment the signals are applied to address control 18 for modulator 13, in timed relation with the energization of illumination source 11 (by color control 17) and the movement of the recording medium M to print a reproduction of the original O.

In accordance with another preferred embodiment of the present invention, logic and control unit 40 includes means for storing and reproducing color information signals for at least one original O. In this embodiment the color information signals generated during the scan of successive lines are input to unit 40 (dotted line in FIG. 3) and stored. In this embodiment, apparatus 30 is constructed for both scanning and printing and thus includes structure in addition to that described with respect to the first, scanner embodiment. Specifically, a panchromatic, exposure illumination source 45 is located so as to cooperate with movable mirror 46 to direct light, through filter disc 35, to uniformly illuminate the rear (i.e. not facing the scan zone) surface of array 37. Also, switch 47 is provided to allow address of shift register 41 directly from unit 40. In the printing mode of operation a recording medium (not shown) is fed along the path previously used to scan original O. Thus, station 31 now becomes an exposure station and each line of the recording medium is subjected to successive color separation exposures. The pixels $P_1, P_2 \ldots P_x$ of array 37 (not operating as a print array) are activated by logic and control unit 40 in properly synchronized relation (with the movement of the recording medium and the rotation of filter disc 35) and in accordance with the color information signals reproduced by unit 40, so as to print a color image corresponding to the stored signals. It will be appreciated that logic and control unit 40 can control the address of pixels $P_1, P_2 \ldots P_x$ either: (1) so that line pixels are addressed in parallel (in accordance with the information for an entire sub-period line scan) or (2) serially, in the same predetermined sequence as the scan (but with "AND" type logic combining the image information to determine whether the light valve transmits light during its operative stage in the serial sequence).

Figure 4:
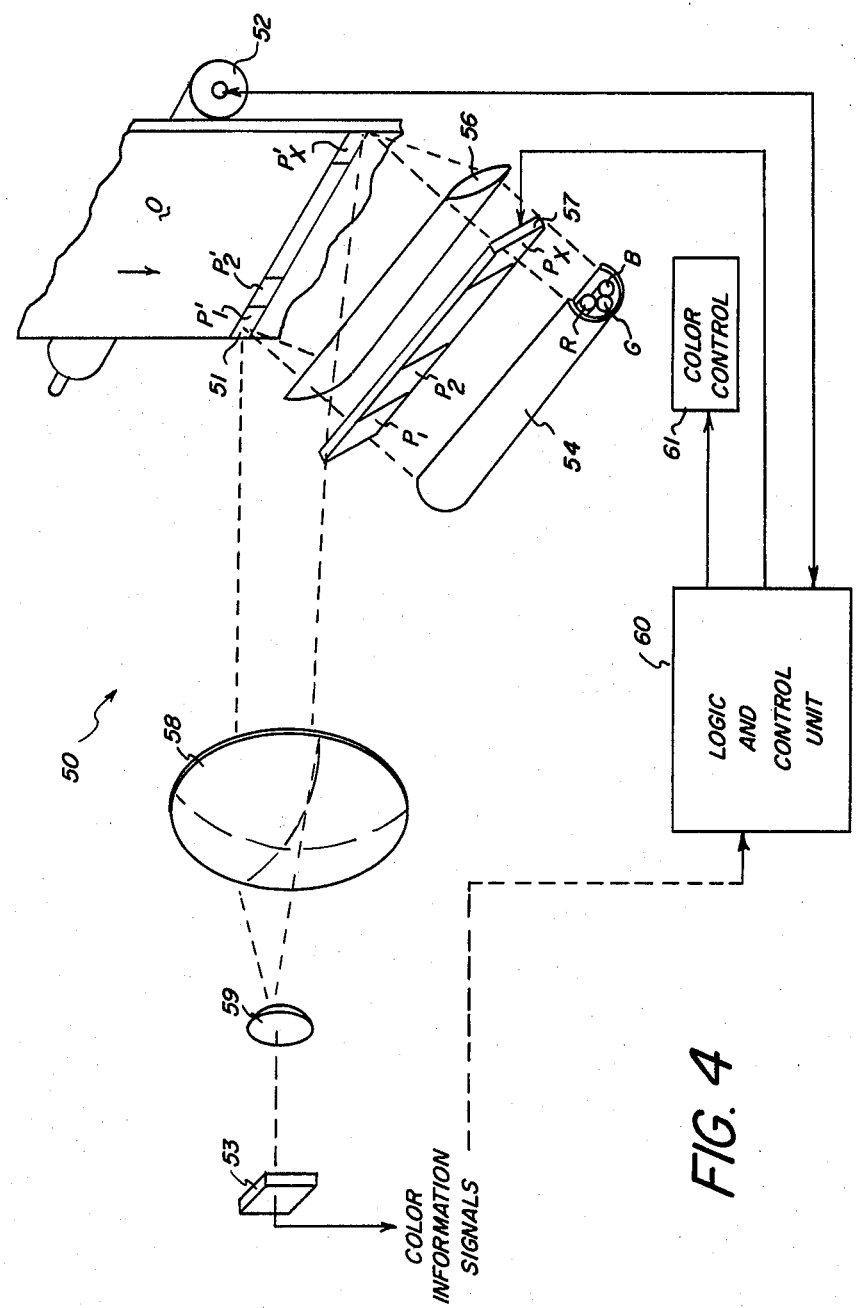
FIG. 4 is a schematic perspective view of an alternative embodiment of scanning or scanning/printing apparatus in accord with the present invention.

Another alternative scanner or scanner/printer apparatus 50 in accord with the present invention is shown in FIG. 4. In this embodiment the means for producing successive color separation illumination of photodetector means 53 comprises multicolor illuminating means 54 adapted to produce at least three sequential different-color light pulses during each line scan period of an original O (here a reflective color original). Thus as each line of original O is moved past linear scan station 51 (by drive means 52), red, green and blue light pulses from illuminating means 54 are directed onto the line by lens means 56, via scan light valve array 57. Light of these different colors which is reflected from the image line is focused by lens 58 and relayed by lens 59 to the panchromatically sensitive photodetector 53.

Light valve scan array 57 is constructed (and its pixel portions $P_1, P_2 \ldots P_x$ addressed by logic and control unit 60) in the same manner as was described with respect to scan array 37 of FIG. 3. Logic and control unit 60 also controls the sequential energization of light sources R, G, B (via color control 61) and synchronizes the address of scan array 57 with color control 61 and drive 52 so that pixel zones $P'_1, P'_2 \ldots P'_x$ of the scan station 51 are illuminated in predetermined serial sequence, during each color separation sub-period of the line scan period. Thus photodetector 52 is subjected to color separation illumination, sequentially reflected from zones $P'_1, P'_2 \ldots P'_x$, during each of the color sub-periods and, in response, produces successive color information signals, each including serial pixel information, for each image line passing the scan station 51.

In one scanner/printer embodiment incorporating scanning apparatus 50, the color information signals from photodetector 53 are input to logic and control unit 19 of the printer apparatus 10 shown in FIG. 1. Printer 10 operates as described above with respect to the FIG. 3 scan signals to print the scanned color image of original O on recording medium M.

In another alternative embodiment, apparatus 50 shown in FIG. 4 can be a scanner/printer. Thus color information signals from photodetector 53 can be input to logic and control unit 60 (which in this embodiment is adapted to store and reproduce those signals). After completion of the scan of original O, a recording sheet is fed past station 51, the light valve 57 is addressed with the stored signals to expose successive lines in proper synchronization with the color control 61 and drive 52.

One skilled in the art will appreciate that the FIG. 3 scanning apparatus could readily be modified to scan a reflective print and that the FIG. 4 apparatus could likewise be modified to scan a transparency.

Another alternative scanner embodiment is shown in FIG. 5, and is similar to the FIG. 3 embodiment in portions not shown. In the preferred embodiment shown in FIG. 5, the illumination means includes dichroic mirrors $M_G$ and $M_R$ instead of a color filter disc and the detector means includes a plurality of discrete photosensors $33_B$, $33_G$ and $33_R$ instead of a single photosensor. More specifically panchromatic light, which has been directed onto (and selectively passes) the scanning light valve array (via lines of a color original at a scan station), is directed by lens means 38', 39' along a detector path. In this embodiment, the dichroic mirrors provide discrete color separation illumination respectively of the discrete photosensors. Thus mirror $M_R$ reflects a red color separation image to photodetector $33_R$ (which is red light sensitive) and passes green and blue color separation images. Next mirror $M_G$ reflects a green color separation image to photosensor $33_G$ (which is green light sensitive) and passes the blue color separation image to photosensor $33_B$ (which is blue light sensitive).

The pixels of the scanning light valve array are actuated as described above and therefore the FIG. 5 embodiment photosensors ($33_R$, $33_G$ and $33_B$) will simultaneously produce discrete color separation signals, each including serial pixel information, for each image line passing the scan station. This embodiment has the advantage of avoiding complex mechanical synchronization of a filter disc. Also because color multiplexing is avoided, light can be detected for each color separation illumination during an entire line cycle, thus increasing the available signal. Further it will be apppreciated that sensors $33_R$, $33_G$ and $33_B$ can be relatively simple and inexpensive devices compared, e.g., to CCD arrays. Thus only the single light valve array need be of a relatively complex electrooptic nature. One skilled in the art will appreciate that appropriate delay circuitry can be provided in the interface between the signals from the FIG. 5 scanner to a printer module such as shown in FIG. 1 to accommodate the sequential color separation exposure mode of that apparatus.

One skilled in the art will appreciate that structures and functions equivalent to the disclosed embodiments of the invention can be achieved by moving the scan apparatus relative to a stationary original or otherwise providing relative movement between the original and the scan apparatus. The invention has been described in detail with particular reference to certain preferred embodiments thereof, but it will be understood that variations and modifications can be effected within the spirit and scope of the invention.

What is claimed is:

1. Apparatus for scanning successive lines of a multicolor original moved past a linear scan station of the apparatus and producing electrical signals indicative of the color image information of such lines, said apparatus comprising:
   (a) photodetector means responsive to incident illumination for producing electrical signals indicative of color separation illuminations thereof;
   (b) illuminating means for producing a plurality of discrete color separation illuminations of said photodetector means via each line passing said scan station;
   (c) light valve array means, including a plurality of discrete pixel portions which are respectively optically aligned with discrete pixel zones of said linear scan station and independently electrically addressable, for controlling color separation illuminations of said photodetector means; and
   (d) scan address means for addressing said pixel portions in a predetermined sequence and in timed relation to the movement of such original to sequentially transmit pixel illumination to said photodetector means;

whereby said photodetector means will produce a plurality of discrete color separation information signals, each including serial pixel information, for each image line passing said scan station.

2. The invention defined in claim 1 further including a cooperative printer apparatus comprising:
   (e) memory means for storing the data contained in said color separation information signals for all lines of such original, and for selectively producing output electrical signals representative of such data;
   (f) means for moving a recording medium through a linear exposure station having a plurality of pixel zones optically aligned, respectively, with pixel portions of said light valve array;
   (g) exposure means, operative in timed relation with the movement of such recording medium, for producing discrete color separation illuminations of each line of such recording medium via said light valve array; and
   (h) exposure address means for activating said light valve pixel portions in accordance with output signals from said memory means and in timed relation with the movement of said recording medium so that the color original is recorded on said recording medium.

3. The invention defined in claim 2 wherein said linear exposure station is coincident with said linear scan station.

4. The invention defined in claim 1 further comprising:
   (e) means for moving a recording medium through a linear exposure station;
   (f) a second light valve array, including a plurality of discrete pixel portions which are respectively optically aligned with discrete pixel zones of said linear exposure station and independently addressable to control the transmission of incident illumination;
   (g) exposure means for producing discrete color separation illuminations of each line of such recording medium via said second light valve array; and (h) control means for receiving color information signals from said photodetector means and addressing said second light valve array in timed relation with the movement of said recording medium and in accordance with such color information signals to expose said recording medium to produce a reproduction of said original.

5. The invention defined in claim 4 wherein said control means includes means for addressing said second light valve array pixel portions in parallel in accordance with color information signals during each respective color separation line illumination by said exposure means.

6. The invention defined in claim 4 wherein said control means includes means for addressing said second light valve array pixel portion in a serial sequence corresponding to said predetermined serial sequence and in accordance with said color information signals during each respective color separation line illumination by said exposure means.

7. The invention defined in claim 1, 2, 3 or 4 wherein said photodetector means comprises a plurality of discrete photosensors each adapted for sensing a different color separation illumination and said illuminating means includes means for panchromatically illuminating lines passing said scan station and means for color separating light passing from said light valve array to said photodetector means.

8. The invention defined in claim 1, 2, 3 or 4 wherein said photodetector means comprises a single photosensor and said illuminating means comprises filter means located between said light valve and said photosensor for providing sequentially color separation exposures of said photosensor.

9. The invention defined in claim 1, 2, 3 or 4 wherein said photodetector means comprises a single photodetector and said illuminating means comprises means for providing sequential color separation illuminations of lines passing said scan station.

10. Apparatus for scanning a multicolor original and producing electrical signals indicative of the color image content of the original, said apparatus comprising:
  (a) means for moving successive lines of an original past a linear scan station of said apparatus;
  (b) means for illuminating said linear scan station with panchromatic light;
  (c) photodetector means responsive to incident light for producing an electrical signal which is indicative of the variation, over time, of incident light energy;
  (d) a light valve array, located optically between said scan station and said photodetector means, and including a plurality of discrete pixel portions which are optically aligned, respectively, with discrete pixel zones of said linear scan station and which are independently addressable, electrically, to control light transmission to said photodetector means;
  (e) means for imaging pixel zones of said scan station onto respective pixel portions of said light valve array;
  (f) means for imaging all pixel portions of said light valve array onto said photodetector means;
  (g) color control means including a plurality of different color filter elements adapted for sequential interposition in the light path from said scan station to said photodetector means and means for synchronizing such sequential interpositions in timed relation with the movement of said original so that at least complete sequence of interpositions occurs during the period while a line of the original is at the scan station; and
  (h) scan address means for addressing pixel portions of said array in timed relation with said color control means and in a predetermined serial sequence to sequentially transmit illumination to said photodetector means;
whereby said photodetector means will produce successive color information signals, each including serial pixel information, for each image line passing said scan station.

11. The invention defined in claim 10 further comprising:
  (i) memory means for storing the data contained in said color information signals for all lines of such original, and for selectively producing output electrical signals representative of such data;
  (j) means for moving a recording medium through a linear exposure station having a plurality of pixel zones optically aligned, respectively, with pixel portions of said light valve array;
  (k) exposure means, operative in timed relation with the movement of such recording medium, for producing successive color separation illuminations of each line of such recording medium via said light valve array; and
  (l) exposure address means for activating said light valve pixel portions in accordance with output signals from said memory means and in timed relation with said exposure means and the movement of said recording medium so that the color original is recorded on said recording medium.

12. The invention defined in claim 11 wherein said linear exposure station is coincident with said linear scan station.

13. The invention defined in claim 10 further comprising:
  (i) means for moving a recording medium through a linear exposure station;
  (j) a second light valve array, including a plurality of discrete pixel portions which are respectively optically aligned with discrete pixel zones of said linear exposure station and independently addressable to control the transmission of incident illumination;
  (k) exposure means, operative in timed relation with the movement of said recording medium, for producing successive color separation illuminations of each line of such recording medium via said second light valve array; and
  (l) control means for receiving color information signals from said photodetector means and addressing said second light valve array in timed relation with said exposure means and in accordance with such color information signals to expose said recording medium to produce a reproduction of said original.

14. The invention defined in claim 13 wherein said control means includes means for addressing said second light valve array pixel portions in parallel in accordance with color information signals during each respective color separation line illumination by said exposure means.

15. The invention defined in claim 13 wherein said control means includes means for addressing said second light valve array pixel portion in a serial sequence corresponding to said predetermined serial sequence and in accordance with said color information signals during each respective color separation line illumination by said exposure means.

16. Apparatus for scanning successive lines of a multicolor original moved past a linear scan station of the apparatus and producing electrical signals indicative of the color image information of such lines, said apparatus comprising:
   (a) photodetector means responsive to incident illumination for producing an electrical signal which is indicative of the variation, over time, of the energy of such incident illumination;
   (b) illuminating means, operative in timed relation with the movement of such original, for producing successive color separation illuminations of said photodetector means via each line passing said scan station;
   (c) a light valve array located between said illuminating means and said photodetector means and including a plurality of discrete pixel portions which are respectively optically aligned with discrete pixel zones of said linear scan station and independently addressable electrically to control illumination of said photodetector means; and
   (d) scan address means for addressing said array pixel portions, in timed relation to the movement of such original and said illuminating means in a predetermined serial sequence, to sequentially transmit such illumination to said photodetector means;
whereby said photodetector means will produce successive color information signals, each including serial pixel information, for each image line passing said scan station.

17. The invention defined in claim 16 further including a cooperative printer apparatus comprising:
   (e) memory means for storing the data contained in said color information signals for all lines of such original, and for selectively producing output electrical signals representative of such data;
   (f) means for moving a recording medium through a linear exposure station having a plurality of pixel zones optically aligned, respectively, with pixel portions of said light valve array;
   (g) exposure means, operative in timed relation with the movement of such recording medium, for producing successive color separation illuminations of each line of such recording medium via said light valve array; and
   (h) exposure address means for activating said light valve pixel portions in accordance with output signals from said memory means and in timed relation with said exposure means and the movement of said recording medium so that the color original is recorded on said recording medium.

18. The invention defined in claim 17 wherein said linear exposure station is coincident with said linear scan station.

19. The invention defined in claim 16 further comprising:
   (e) means for moving a recording medium through a linear exposure station;
   (f) a second light valve array, including a plurality of discrete pixel portions which are respectively optically aligned with discrete pixel zones of said linear exposure station and independently addressable to control the transmission of incident illumination;
   (g) exposure means, operative in timed relation with the movement of said recording medium, for producing successive color separation illuminations of each line of such recording medium via said second light valve array; and
   (h) control means for receiving color information signals from said photodetector means and addressing said second light valve array in timed relation with said exposure means and in accordance with such color information signals to expose said recording medium to produce a reproduction of said original.

20. The invention defined in claim 19 wherein said control means includes means for addressing said second light valve array pixel portions in parallel in accordance with color information signals during each respective color separation line illumination by said exposure means.

21. The invention defined in claim 19 wherein said control means includes means for addressing said second light valve array pixel portion in a serial sequence corresponding to said predetermined serial sequence and in accordance with said color information signals during each respective color separation line illumination by said exposure means.

22. Apparatus for scanning successive lines of a multicolor original during movement past a linear scan station of said apparatus, said apparatus comprising: (1) photodetector means including a plurality of discrete photosensors, (2) illuminating means for producing a plurality of discrete color separation illuminations respectively of said discrete photosensors of said photodetector means, via each original line passing the scan station; (3) a light valve array, located between said photodetector means and said scan station and including a plurality of discrete pixel portions optically aligned, respectively, with discrete pixel zones of said linear scan station and individually addressable electrically to control color separation illuminations of said photodetector means; and (4) scan address means for addressing said array pixel portions, in a predetermined serial sequence and in timed relation with the movement of the original, to sequentially transmit illumination from respective pixel zones to said photodetector means.

* * * * *